(12) United States Patent
Tokita et al.

(10) Patent No.: US 8,071,057 B2
(45) Date of Patent: Dec. 6, 2011

(54) MICROFLUIDIC DEVICE

(75) Inventors: Toshinobu Tokita, Yokohama (JP); Kosuke Fujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 12/268,521

(22) Filed: Nov. 11, 2008

(65) Prior Publication Data

US 2009/0129981 A1    May 21, 2009

(30) Foreign Application Priority Data

Nov. 20, 2007    (JP) .................................. 2007-300343

(51) Int. Cl.
*B01J 19/18* (2006.01)

(52) U.S. Cl. ........ 422/538; 422/540; 422/503; 422/417; 422/68.1

(58) Field of Classification Search ........................ None
See application file for complete search history.

(56) References Cited

U.S. PATENT DOCUMENTS

| | | |
|---|---|---|
| 5,932,799 A | 8/1999 | Moles |
| 6,408,878 B2 | 6/2002 | Unger et al. |
| 2007/0154355 A1 | 7/2007 | Berndt et al. |

*Primary Examiner* — In Suk Bullock
*Assistant Examiner* — Timothy G Kingan
(74) *Attorney, Agent, or Firm* — Fitzpatrick, Cella, Harper & Scinto

(57) ABSTRACT

A microfluidic valve device includes a microfluidic chip including a substrate having a channel, a valve disposed within the channel and configured to change a conductance of the channel, with the valve having an inner channel formed therein, and an oscillator configured to generate a traveling wave. The valve is moved by generating the traveling wave to open and close the channel.

21 Claims, 11 Drawing Sheets

MICROFLUIDIC DEVICE

BACKGROUND OF THE INVENTION

1. Field of the Invention

The present invention relates to a microfluidic device using a microfluidic chip.

2. Description of the Related Art

Recently, micro electro mechanical systems (MEMS) have been interested in the fields of, for example, biology, environmental analysis, and chemical synthesis. One of the fields with MEMS applied may be micro total analysis systems (μTAS). μTAS collectively perform chemical synthesis and chemical analysis on a microchip. A microfluidic chip is used as the microchip. The microfluidic chip is formed such that a microchannel is formed in a substrate made of a semiconductor, glass, ceramic, synthetic resin, or the like. For example, an analyte, a reagent, and/or liquid or powder (hereinafter, referred to as fluid) which is a material for the chemical synthesis, flows through the channel, and the chemical analysis or chemical synthesis is performed in the microfluidic chip. With the use of the microfluidic chip, the chemical analysis or chemical synthesis using fluid with a very small amount is available, and a feature of a high reaction rate is obtained. Thus, development of the microfluidic device using the microfluidic chip is desired.

For the actual use of the microfluidic chip, a unit of measuring and acquiring a sample for analysis by a given amount is necessary. Owing to this, a valve is provided in the channel of the microfluidic chip. The microfluidic chip having the valve may be one having a diaphragm valve or one that deforms a channel to control the flow of fluid in the channel.

U.S. Pat. No. 5,932,799 (hereinafter, referred to as the '799 document) discloses in the specification a microfluidic chip having a diaphragm valve. FIGS. 10A and 10B are cross-sectional views schematically showing the microfluidic chip described in the '799 document. A microfluidic chip 101 includes a substrate 108 in which channels 102a and 102b are formed. Referring to FIG. 10A, a diaphragm 103 is provided to close the upstream channel 102a and the downstream channel 102b. The diaphragm 103 is formed of a deformable member. A driving unit 104 is connected so as to deform the diaphragm 103. By deforming the diaphragm 103 using the driving unit 104, the state is switched between a state in which the upstream channel 102a and the downstream channel 102b are decoupled (see FIG. 10A) and a state in which the channels 102a and 102b are coupled (see FIG. 10B).

U.S. Pat. No. 6,408,878 (hereinafter, referred to as the '878 document) discloses in the specification a microfluidic chip that deforms a channel to control the flow of fluid. FIGS. 11A and 11B are cross-sectional views schematically showing the microfluidic chip described in the '878 document. A microfluidic chip 111 includes a substrate 118 in which a channel 112 is formed. Fluid such as a reagent or an analyte flows through the channel 112. The substrate 118 also has a valve driving channel 114 so as to three-dimensionally intersect with the channel 112. At least a portion in which the channel 112 three-dimensionally intersects with the valve driving channel 114 is made of a soft material such as, for example, poly-dimethyl siloxane (PDMS) 113. FIG. 11A illustrates the microfluidic chip 111 in a state in which the upstream side and the downstream side of the channel 112 are coupled. To decouple the upstream side from the downstream side of the channel 112, compressed air is applied to the valve driving channel 114. Accordingly, the pressure in the valve driving channel 114 increases, and the PDMS 113 is deformed. The deformed PDMS 113 presses the channel 112, thereby blocking the flow in the channel 112.

As described above, with the microfluidic chip described in the specification of the '799 document or the '878 document, a sample, which is necessary for analysis and which flows in the channel, can be measured and acquired by a given amount.

However, in the microfluidic chip described in the specification of the '799 document, the driving unit has to be provided to deform the diaphragm, resulting in a complicated structure. Thus, the microfluidic chip becomes large and expensive.

Also, in the microfluidic chip described in the specification of the '878 document, the valve driving channel has to be largely deformed, thereby reducing durability. In addition, the soft material such as PDMS causes the liquid or gas, in particular, a vaporized material to leak, and the leakage produces contamination.

SUMMARY OF THE INVENTION

The present invention provides a microfluidic chip having a simple structure, and a microfluidic device using the microfluidic chip. Also, the present invention provides a microfluidic chip in which leakage from a channel is reduced and contamination is substantially reduced or even prevented.

In particular, according to an aspect of the present invention, a microfluidic valve device includes a microfluidic chip including a substrate having a channel; a valve disposed within the channel and configured to change a conductance of the channel; and an oscillator configured to generate a traveling wave. The valve is moved by generating the traveling wave to open and close the channel.

According to another aspect of the present invention, a microfluidic device includes a microfluidic chip with a substrate having a channel, a valve provided movably in a pressure-generating portion in the microfluidic chip, and an oscillator configured to generate a traveling wave to move the valve. A pressure of the pressure-generating portion increases or decreases in accordance with the movement of the valve, and hence, fluid in the channel is pumped.

With the aspects of the present invention, the microfluidic device with the microfluidic chip having the simple structure, and being capable of reducing the leakage from the channel and preventing the contamination, can be provided.

Further features of the present invention will become apparent from the following description of exemplary embodiments with reference to the attached drawings.

DESCRIPTION OF THE EMBODIMENTS

Embodiments of the present invention are described below with reference to the attached drawings.

First Embodiment

Figure 1A:
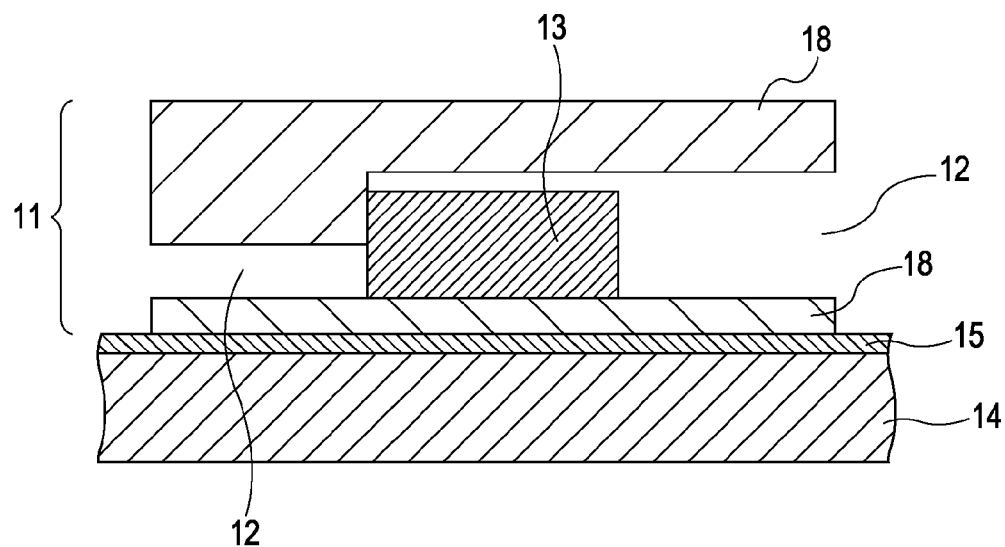
FIG. 1A is a cross-sectional view showing a microfluidic device in a valve-closing state.
Figure 1B:
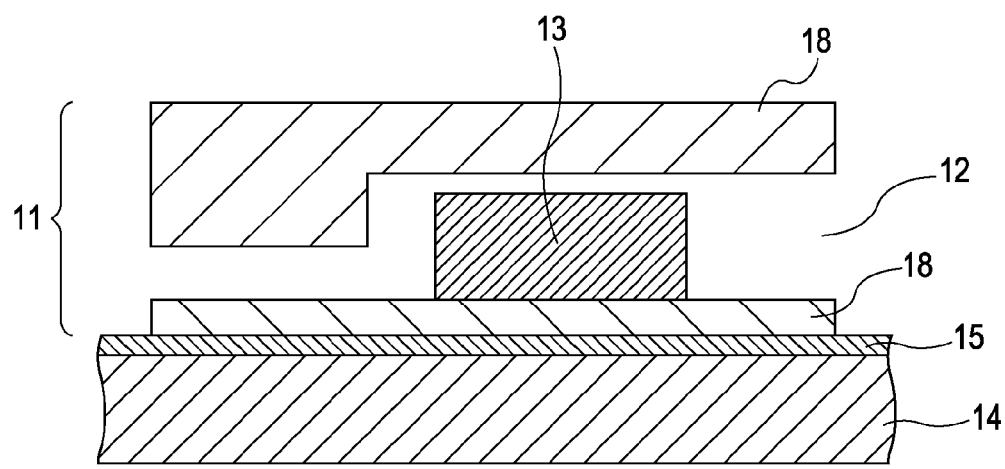
FIG. 1B is a cross-sectional view showing the microfluidic device in a valve-opening state.
Figure 2:
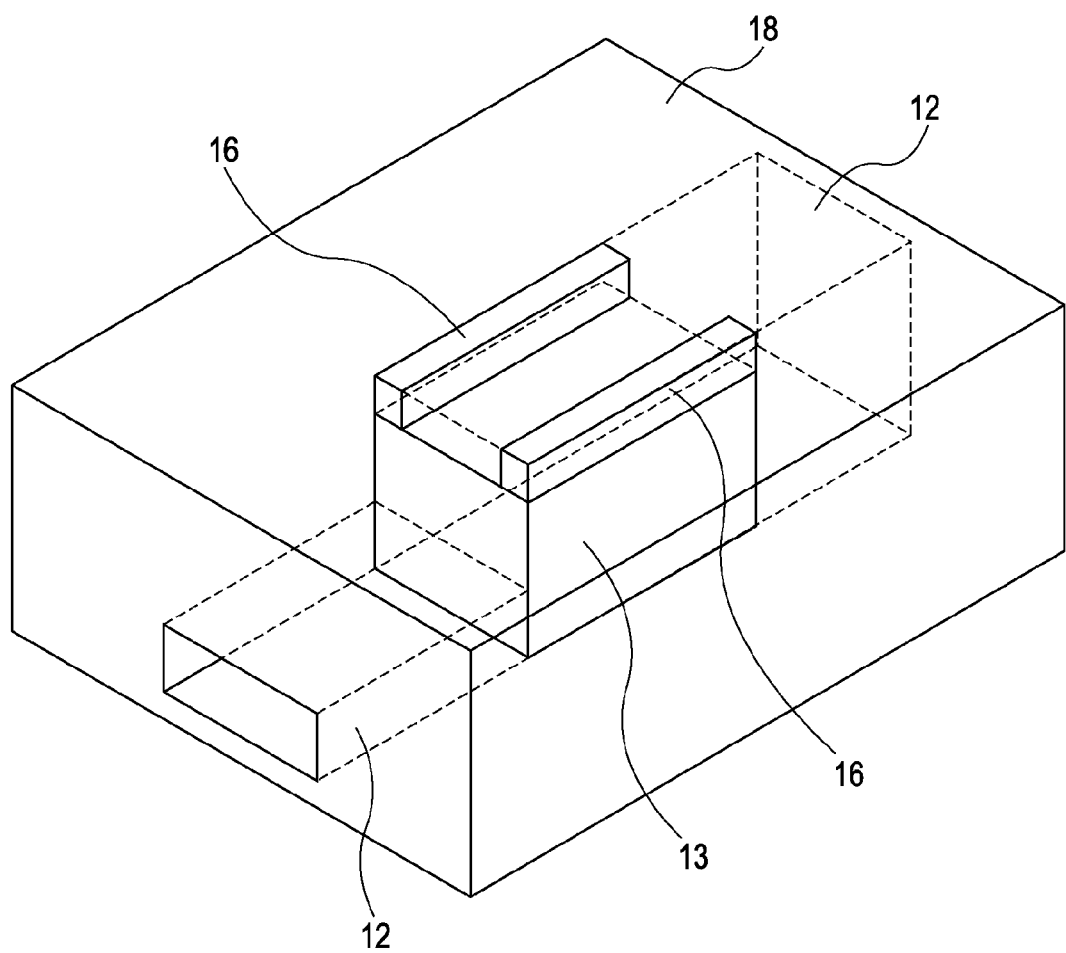
FIG. 2 is a perspective view schematically showing the microfluidic chip used in FIGS. 1A and 1B.

FIGS. 1A and 1B are cross-sectional views each showing a microfluidic device according to this embodiment. FIG. 2 is a perspective view schematically showing a microfluidic chip provided in the microfluidic device. In FIG. 2, an upper portion of a substrate is not illustrated so that the inner structure of the microfluidic chip is apparent. The microfluidic device includes a microfluidic chip 11 and an ultrasonic stator 14. The ultrasonic stator 14 has a holding portion 15 to hold the microfluidic chip 11. The microfluidic chip 11 is held by the holding portion 15. Holding of the microfluidic chip 11 by the holding portion 15 may use an attractive force such as, for example, a magnetic force, a vacuum force, or an electrostatic force. Also, the microfluidic chip 11 can be held in a replaceable manner.

The microfluidic chip 11 is formed of a substrate 18 with a very small channel 12 having, for example, a rectangular cross section. In the channel 12, pumping, mixing and stirring, and/or separating of fluid, such as an analyte, a reagent, and/or a material for chemical synthesis is performed. In addition, a valve 13 is provided in the channel 12. The shape of the valve 13 is a rectangular-parallelepiped. The valve 13 is provided movably in the channel 12. The cross section of an upstream portion of the channel 12 is larger than that of a downstream portion. When the valve 13 is moved to the downstream portion of the channel 12, the valve 13 closes the downstream portion of the channel 12. The upstream portion and the downstream portion of the channel 12 are thus decoupled (hereinafter, the state is called valve-closing state as shown in FIG. 1A). In contrast, when the valve 13 is moved to the upstream portion of the channel 12, the upstream portion and the downstream portion of the channel 12 are coupled (hereinafter, the state is called valve-opening state as shown in FIG. 1B). Accordingly, passing of fluid from the upstream portion to the downstream portion of the channel 12 with respect to the valve 13 is permitted or inhibited by the movement of the valve 13 for changing a conductance of the channel 12.

The valve 13 is moved by the ultrasonic stator 14 which serves as a moving unit of the valve 13. The ultrasonic stator 14 is an ultrasonic transducer. For example, a stator of an ultrasonic motor is used. The ultrasonic stator 14 generates a traveling wave. The traveling wave is transmitted to the substrate 18 of the microfluidic chip 11 via the holding portion 15. The valve 13, which is in contact with the substrate 18, is moved by the traveling wave transmitted to the substrate 18, in a direction opposite to a traveling direction of the traveling wave. That is, the state can be controlled between the valve-closing state and the valve-opening state through the control of the traveling direction of the traveling wave by the ultrasonic stator 14. For the valve-closing state, the traveling wave is generated from the downstream portion to the upstream portion of the channel 12. For the valve-opening state, the traveling wave is generated from the upstream portion to the downstream portion.

In this embodiment, while the upstream portion of the channel 12 has the larger cross section, the downstream portion of the channel 12 may have a larger cross section. In this case, the valve-closing state is obtained when the valve 13 is moved to the upstream portion of the channel 12, and the valve-opening state is obtained when the valve 13 is moved to the downstream portion of the channel 12.

Also, referring to FIG. 2, the microfluidic chip 11 has a PDMS 16, which serves as a pressing unit, between the valve 13 and an upper portion of the substrate 18. The PDMS 16 is inserted between the valve 13 and the upper portion of the substrate 18 in a compressed manner, so as to press the valve 13 to an upper surface of a lower portion of the substrate 18. At this time, the PDMS 16 is provided at a portion of a space defined between the valve 13 and the substrate 18 to prevent the upstream portion and the downstream portion of the channel 12 from being decoupled in the valve-opening state. As described above, since the valve 13 is sufficiently pressed to the upper surface of the lower portion of the substrate 18 and thus a frictional force is generated, the valve 13 is smoothly moved by the traveling wave generated by the ultrasonic stator 14.

In this embodiment, while the PDMS 16 is used as the pressing unit, the pressing unit may be formed of any material as long as the material is elastic. For example, the pressing unit may be a spring, such as a leaf spring or a coil spring. Also, the pressing unit is not limited to the insertion of an elastic body as described above. For example, the pressing unit may be an attractive force of, for example, a magnetic force generated between the valve 13 and the ultrasonic stator 14. In this case, a magnet may be provided at one of the valve 13 and the ultrasonic stator 14, and a magnetic body may be provided at the other. Alternatively, magnets may be provided at both the valve 13 and the ultrasonic stator 14 such that opposing surfaces have different polarities.

Still alternatively, magnets may be provided at the valve 13 and the substrate 18 located above the valve 13 such that opposing surfaces have the same polarity. Accordingly, a magnetic repulsive force is generated, and the valve 13 is pressed to the upper surface of the lower portion of the substrate 18.

In the microfluidic chip 11 with the above-described structure, since the moving unit of the valve 13 is provided outside the microfluidic chip 11, the structure becomes extremely simple. Accordingly, reduction in size and cost of the microfluidic chip 11 can be promoted. In addition, a drive source of a valve is not provided at the substrate 18, and the channel 12 is not deformed. Accordingly, leakage of the fluid from the channel 12 and contamination can be prevented. The materials of the substrate 18 and the valve 13 are not particularly limited as long as the valve 13 is movable in the channel 12. Hence, a material effective for preventing the leakage of the fluid in the channel 12 and the contamination can be used.

In the above-described structure, while the valve is moved in an extending direction of the channel, the valve may be moved in a direction perpendicular to the extending direction of the channel, which will be described in a later embodiment.

Second Embodiment

Figure 3:
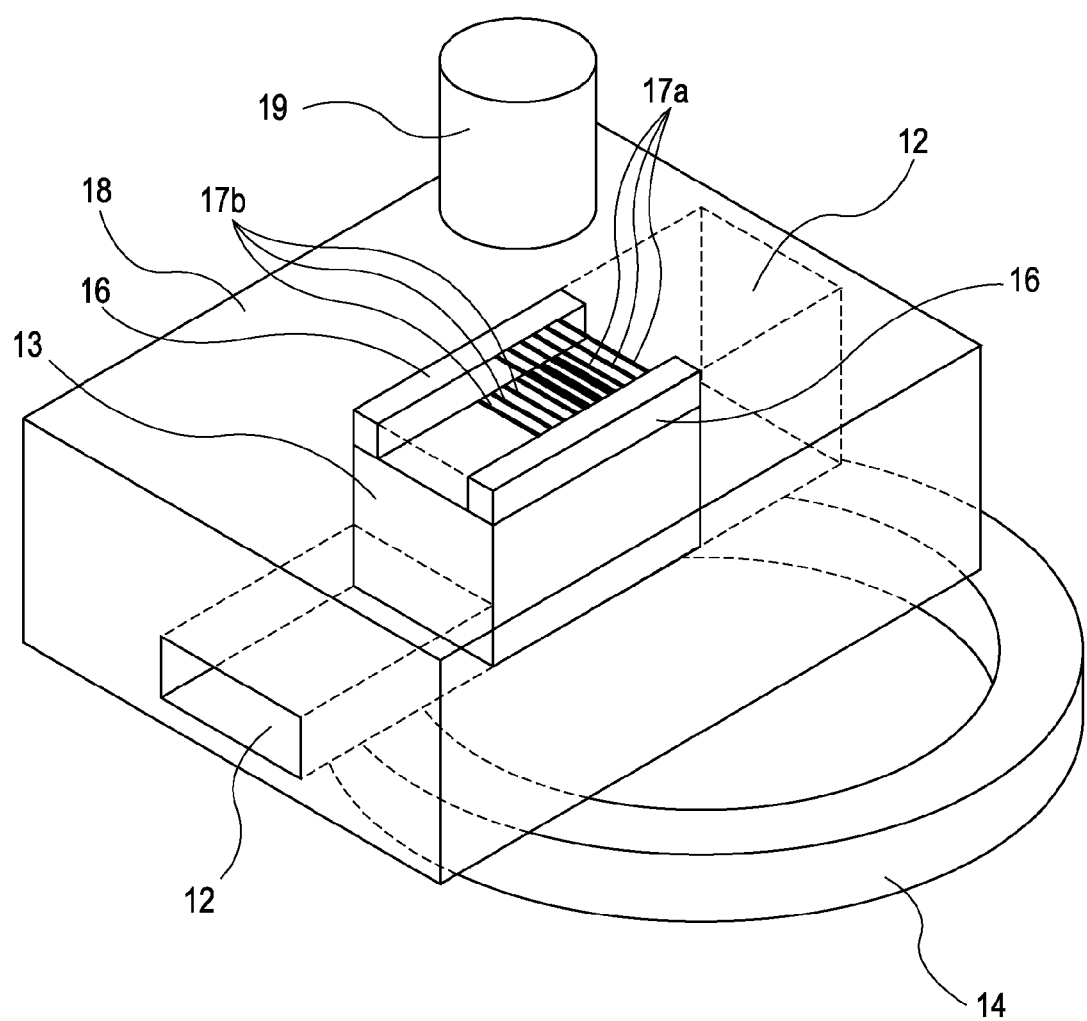
FIG. 3 is a perspective view schematically showing a microfluidic device according to an embodiment of the present invention.

Now, a structure of a microfluidic device according to another embodiment is described. FIG. 3 is a perspective view schematically showing a microfluidic device according to this embodiment. The microfluidic device includes a microfluidic chip 11, an ultrasonic stator 14, and a detection system 19. The microfluidic chip 11 is held by a holding portion (not shown) formed at the ultrasonic stator 14. The structure of the microfluidic chip 11 in this embodiment is similar to that of the microfluidic chip 11 illustrated in FIG. 2, except that a reference scale 17a and a scale 17b are additionally provided. The reference scale 17a is fixed to the substrate 18, whereas the scale 17b is fixed to the valve 13. The reference scale 17a and the scale 17b are provided at opposite positions. The detection system 19 can detect the reference scale 17a and the scale 17b. The detection system 19 is arranged above the valve 13 of the microfluidic chip 11 in a noncontact manner. The position of the microfluidic chip 11 can be detected by detecting the reference scale 17a fixed to the substrate 18, and the position of the valve 13 can be detected by detecting the scale 17b fixed to the valve 13. Also, the relative position of the valve 13 with reference to the position of the microfluidic chip 11 can be detected by simultaneously detecting the reference scale 17a and the scale 17b.

In particular, an effective detection method may be, for example, optical detection. Since the reference scale 17a and the scale 17b are oppositely arranged, the detection system 19 detects moire fringes by using interference between light passing through the reference scale 17a and light passing through the scale 17b. The moire fringes are moved in accordance with a change in the relative positions of the reference scale 17a and the scale 17b. Thus, by detecting the movement of the moire fringes, a travel distance of the valve 13 with reference to the microfluidic chip 11 can be detected. Accordingly, it can be detected whether the state is the valve-opening state or the valve-closing state. An erroneous operation in opening/closing of the valve can be prevented. Also, since the travel distance of the valve 13 can be detected, the valve 13 can be moved to a proper position in accordance with a flow rate or a pressure of the fluid in the channel 12. Herein, the traveling wave generated by the ultrasonic stator 14 is controlled on the basis of the detection result of the position of the valve 13. Thus, the microfluidic device according to this embodiment can control the flow rate and pressure of the fluid. Also, since the position of the valve 13 can be detected in a noncontact manner, the durability of the microfluidic chip 11 can be increased, and the leakage of the content and the contamination can be prevented.

In this embodiment, while the relative position of the valve 13 is detected by detecting the moire fringes, the detection of the valve 13 is not limited thereto. Any detecting unit may be used for detecting the relative position of the valve 13, as long as the travel distance can be detected in a noncontact manner.

Also, in this embodiment, while the reference scale 17a and the scale 17b are oppositely arranged, a scale may be provided only at the valve 13. In this case, the position of the valve 13 can be determined by counting the number of scale bars passing through an area directly below the detection system 19.

Third Embodiment

Figure 4A:
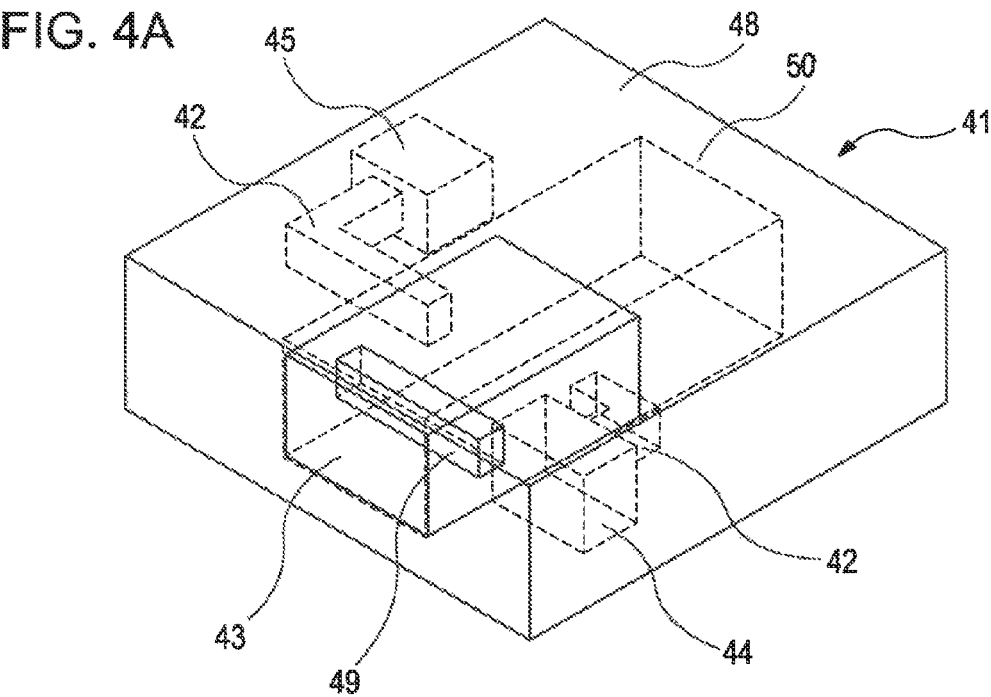
FIG. 4A is a perspective view schematically showing a microfluidic chip in a valve-closing state.
Figure 4B:
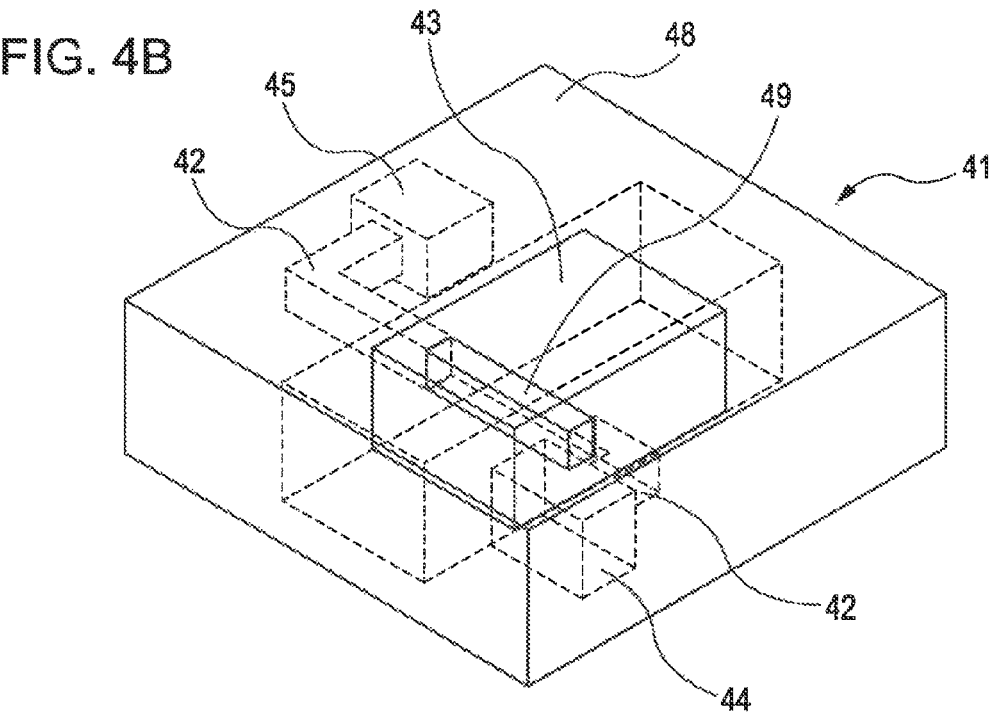
FIG. 4B is a perspective view schematically showing the microfluidic chip in a valve-opening state, according to an embodiment of the present invention.
Figure 5:
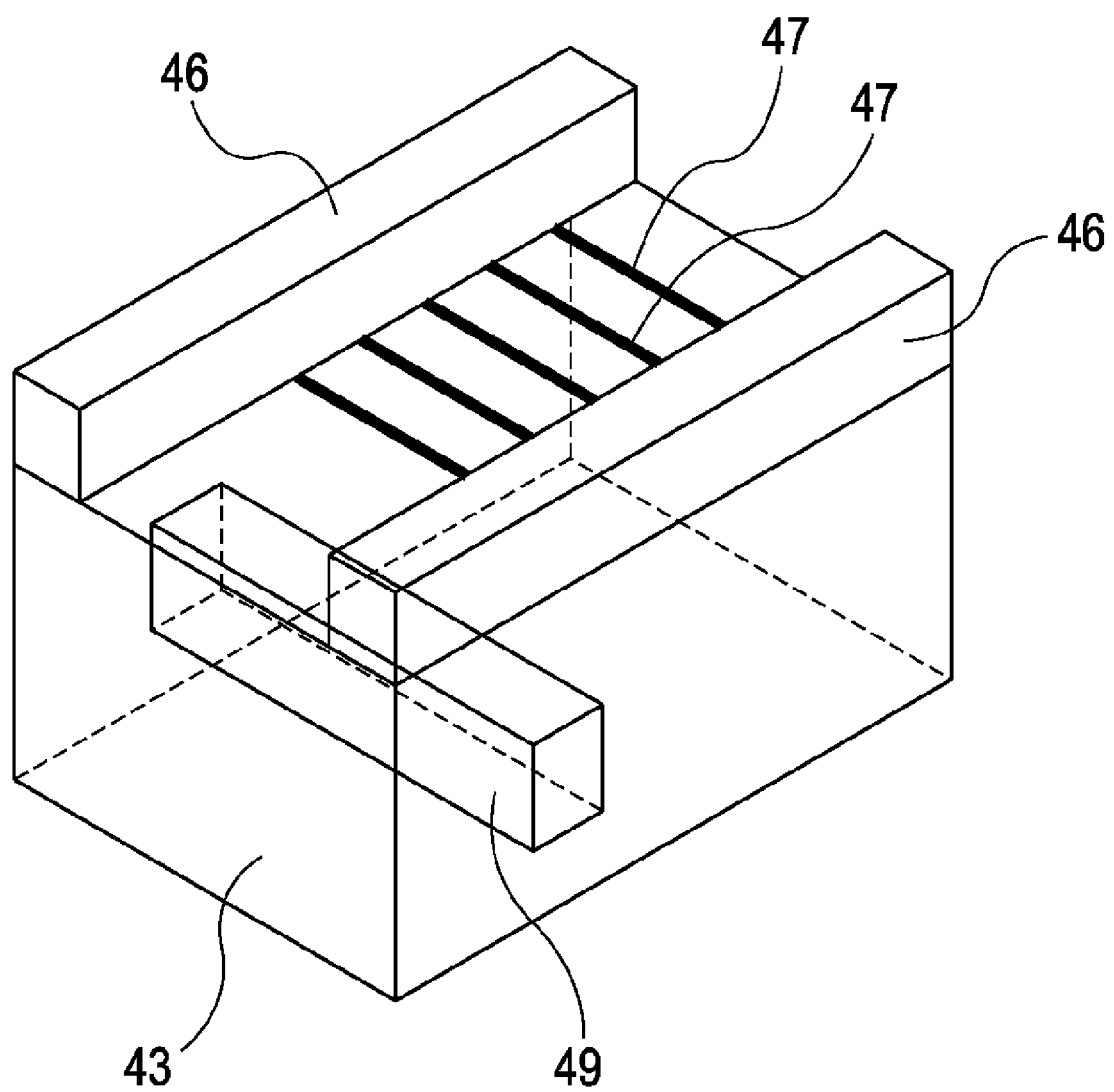
FIG. 5 is a perspective view specifically showing a valve of the microfluidic chip in FIGS. 4A and 4B.

Next, another embodiment of a microfluidic chip is described. FIG. 4A is a perspective view schematically showing a microfluidic chip in a valve-closing state, and FIG. 4B is a perspective view schematically showing the microfluidic chip in a valve-opening state, according to this embodiment. Also, FIG. 5 is a perspective view specifically showing a valve of the microfluidic chip in FIGS. 4A and 4B.

A microfluidic chip 41 is formed of a substrate 48 with a very small channel 42. A first chamber 44 is provided at an upstream end portion of the channel 42, and a second chamber 45 is provided at a downstream end portion of the channel 42. The first chamber 44 is a flow source of fluid to be used in analysis. The first chamber 44 contains, for example, a reagent or an analyte. The second chamber 45 is an area for reaction of the reagent or the analyte flowing from the first chamber 44.

Also, a valve 43 is provided in the microfluidic chip 41 so as to decouple an upstream portion from a downstream portion of the channel 42. The valve 43 has an inner channel 49 formed to penetrate through the valve 43. The valve 43 is provided movably in the substrate 48 within an inner chamber 50. The inner channel 49 can be coupled to the channel 42 by the movement of the valve 43. In particular, the state is controlled between a state in which the upstream portion and the downstream portion of the channel 42 are decoupled by the valve 43 (valve-closing state) as shown in FIG. 4A, and a state in which the upstream portion and the downstream portion of the channel 42 are coupled via the inner channel 49 (valve-opening state) as shown in FIG. 4B. Accordingly, passing of fluid from the upstream portion to the downstream portion of the channel 42 with respect to the valve 43 is permitted or inhibited via the inner channel 49 by the movement of the valve 43. The fluid contained in the first chamber 44 flows into the second chamber 45 via the inner channel 49 by pumping the fluid using a pump (not shown) from the first chamber 44 to the second chamber 45 in the valve-opening state.

Similarly to the first and second embodiments, the valve 43 is moved by a traveling wave generated by an ultrasonic stator, which serves as a moving unit of the valve 43. Herein, referring to FIG. 5, the microfluidic chip 41 may be provided with a PDMS 46 as a pressing unit. The PDMS 46 is inserted between the valve 43 and an upper portion of the substrate 48 in a compressed manner. Also, a scale 47 may be fixed to the valve 43 as shown in FIG. 5 so that the microfluidic device can detect a travel distance of the valve 43. In this case, the microfluidic device having the microfluidic chip 41 of this embodiment has a detection system capable of detecting the scale 47.

The microfluidic chip 41 according to this embodiment is effectively used as a constant rate injector for fluid to be used in analysis. In this case, the second chamber 45 serves as a waste-fluid chamber. The fluid contained in the first chamber 44 is pumped to the inner channel 49 in the valve-opening state. Then, when the state is changed to the valve-closing state, the fluid to be used in analysis can be injected by a volume corresponding to the inner channel 49.

In the first to third embodiments, while the fluid flows from the upstream portion to the downstream portion, the flow direction of the fluid is not particularly limited. That is, the flow direction of the fluid does not have to be one direction, as long as fluid in a channel arranged at a side of a valve can flow to a channel arranged at another side of the valve.

Fourth Embodiment

Figure 6:
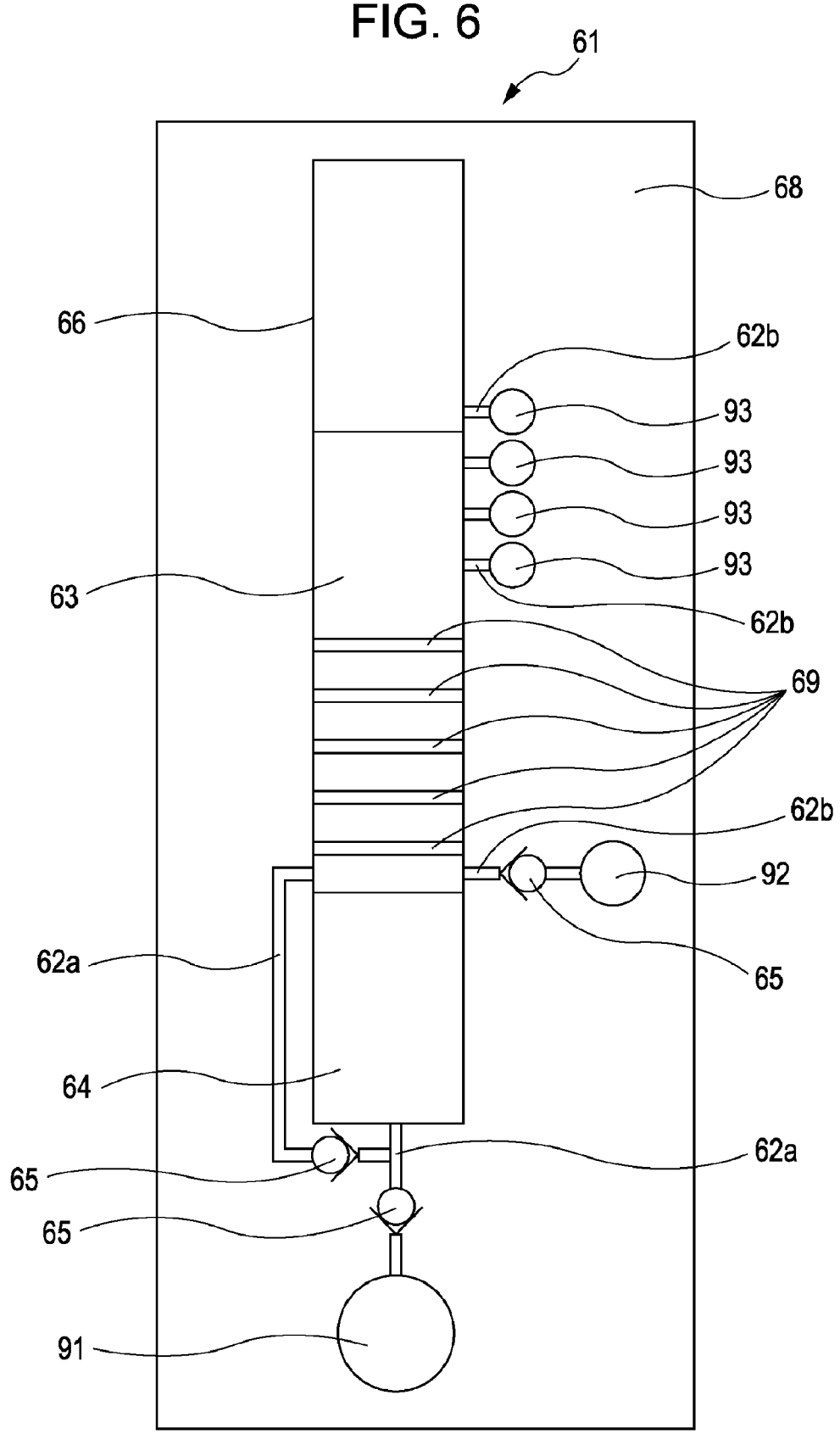
FIG. 6 is a top view schematically showing a microfluidic chip according to an embodiment of the present invention.

Next, a microfluidic chip and a microfluidic device using the microfluidic chip are described according to another embodiment. FIG. 6 is a top view schematically showing the microfluidic chip according to this embodiment. A microfluidic chip 61 is formed of a substrate 68 with very small channels 62a and 62b. A chamber 91 which contains fluid to be used in analysis is provided at an end portion of the upstream channel 62a. The upstream channel 62a has two check valves 65, thereby permitting the fluid to flow only in one direction. The channel 62b involves five channels 62b arranged at a downstream side. One of the downstream channels 62b is provided with a waste-fluid chamber 92, to which waste fluid not to be used in analysis flows. That downstream channel 62b has a check valve 65, thereby permitting the waste fluid to flow only in one direction. Also, end portions of the residual four channels 62b are respectively provided with reagent chambers 93 which respectively contain reagents for reaction with the fluid to be used in analysis. A valve 63 is provided at the substrate 68 movably so as to decouple the upstream channel 62a from the downstream channels 62b. Also, the valve 63 has five inner channels 69.

The five inner channels 69 are sequentially coupled with the upstream channel 62a by moving the valve 63 in a direction. Also, four of the five inner channels 69 are respectively coupled with the downstream channels 62b formed at the four reagent chambers 93 by moving the valve 63 in an opposite direction. In this way, the fluid in the upstream channel 62a can pass through the valve 63 to the downstream channel 62b by the reciprocating movement of the valve 63.

The valve 63 is movable within a given range, that is, a movable range 66. An end portion of the movable range 66 defines a pressure-generating portion 64 which is a space surrounded by the substrate 68 and the valve 63. The pressure-generating portion 64 is coupled with a portion of the upstream channel 62a, the portion being interposed between the two check valves 65. When the valve 63 is moved, the pressure in the pressure-generating portion 64 increases or decreases, and the pressure in the upstream channel 62a is changed accordingly. That is, the movement of the valve 63 functions as a pump for pumping fluid. As described above, since the change of pressure in the channel 62a caused by the movement of the valve 63 is used as a pumping unit, an additional pumping unit is not necessary for the microfluidic chip 61 in this embodiment. Thus, the microfluidic chip 61 becomes a simpler structure, and reduction in size and cost can be promoted.

Next, a microfluidic device using the microfluidic chip 61 is described. An example of polymerase chain reaction (PCR) by a fluorescent probe method using the microfluidic device is described. In this embodiment, an analyte including nucleic acids is contained in the chamber 91 of the microfluidic chip 61. Also, reagents (enzymes or primers) are respectively injected into the reagent chambers 93.

Figure 7A:
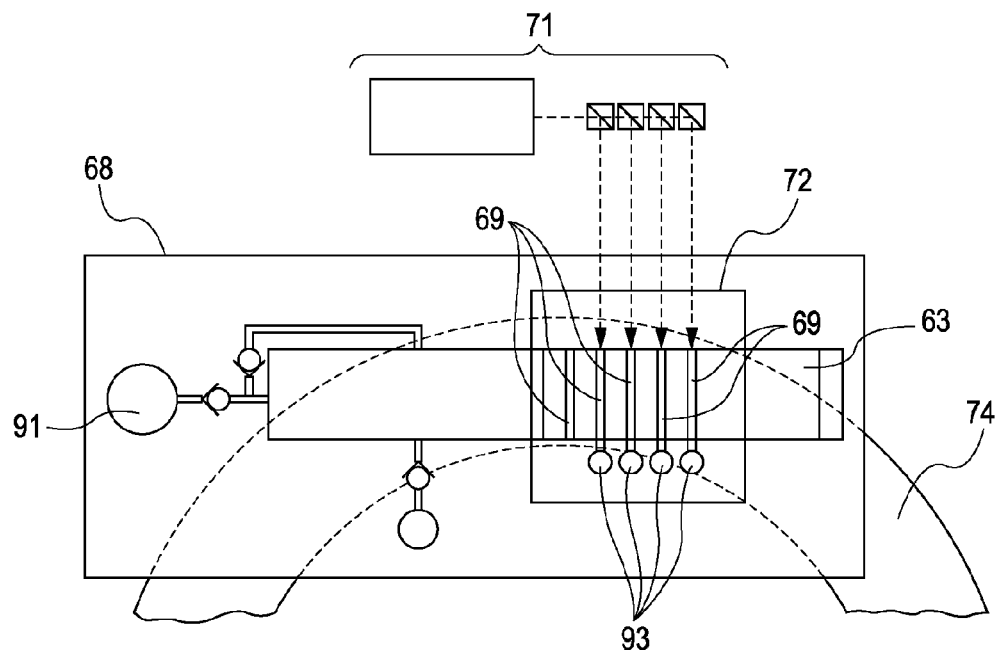
FIG. 7A is a top view schematically showing a microfluidic device using the microfluidic chip in FIG. 6.
Figure 7B:
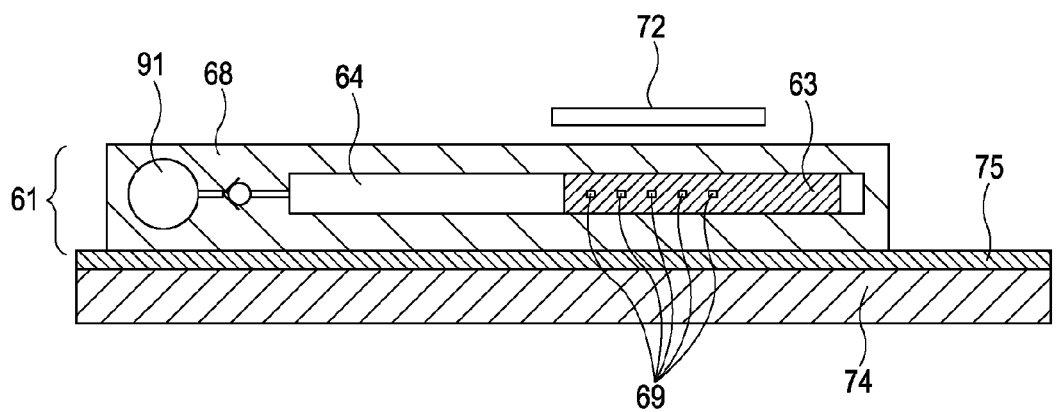
FIG. 7B is a side view schematically showing the microfluidic device.

FIG. 7A is a top view schematically showing the microfluidic device. FIG. 7B is a side view schematically showing the microfluidic device. The microfluidic device includes the microfluidic chip 61 shown in FIG. 6, an ultrasonic stator 74, a sensor 72, and an excitation light irradiating unit 71. The microfluidic chip 61 is held by a holding portion 75 formed at the ultrasonic stator 74. The ultrasonic stator 74 generates a traveling wave, and causes a traveling wave to be produced at the substrate 68 of the microfluidic chip 61 through the holding portion 75. With the traveling wave, the valve 63 is moved in a direction opposite to a traveling direction of the traveling wave.

As described above, the change of pressure in the channel 62a caused by the movement of the valve 63 functions as a pump for pumping an analyte. Hence, the ultrasonic stator 74 also serves as a drive source of the pump. The drive source of the pump is provided outside the microfluidic chip 61. Accordingly, the microfluidic chip 61 becomes a simple structure. Also, contamination as a result of leakage of fluid from the channels 62a and 62b can be prevented.

A laser is used as the excitation light irradiating unit 71. The laser is configured to irradiate four reagent chambers 93 and the inner channels 69 coupled to the reagent chambers 93 with excitation light. The sensor 72 detects the intensity of fluorescent light emitted from a nucleic acid which is excited by the exciting light. The sensor 72 is provided above the valve 63.

Figure 8A:
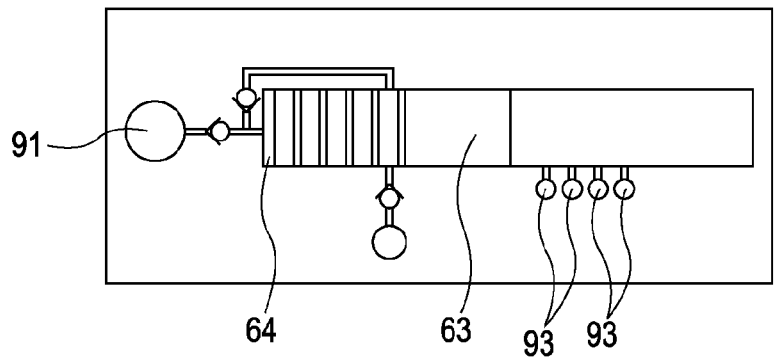
FIGS. 8A to 8D each illustrate an operation process of the microfluidic device relating to mixing of an analyte and a reagent.
Figure 8B:
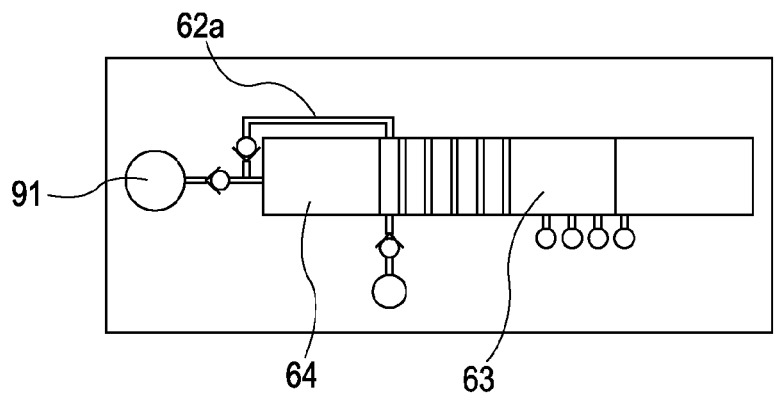
Figure 8C:
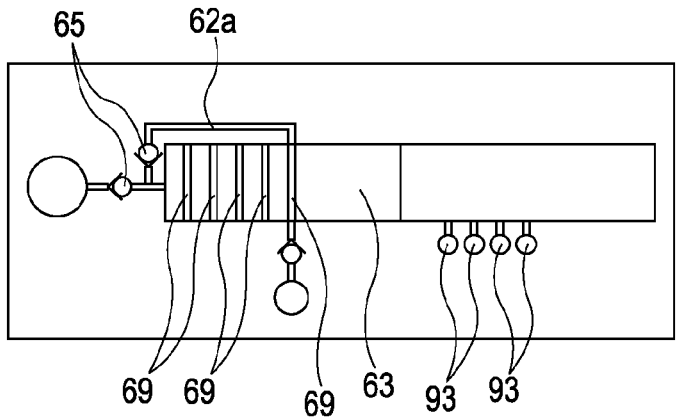

FIGS. 8A to 8D illustrate a process of mixing the analyte with the reagents in preparation for the polymerase chain reaction (PCR). FIG. 8A illustrates an initial state of the microfluidic device in this process. The valve 63 is moved in advance so that the space of the pressure-generating portion 64 is decreased. In the initial state, the analyte including the nucleic acids is injected into the chamber 91. Also, the reagents (enzymes or primers) are respectively injected into the reagent chambers 93. It is desirable that the analyte is injected into the chamber 91 after the valve 63 is moved to the above-described position.

Then, the analyte is pumped to the pressure-generating portion 64. In particular, the ultrasonic stator generates the traveling wave, so that the valve 63 is moved to increase the space of the pressure-generating portion 64. Accordingly, the pressure in the pressure-generating portion 64 is decreased, and hence, the analyte flows into the pressure-generating portion 64 from the chamber 91 (see FIG. 8B).

Then, the ultrasonic stator generates the traveling wave in the direction opposite to that of the above process, so that the valve 63 is moved to decrease the space of the pressure-generating portion 64. Accordingly, the pressure in the pressure-generating portion 64 is increased, and hence, the analyte is pumped from the pressure-generating portion 64 to the channel 62a. At this time, since the check valve 65 is provided, the analyte is pumped toward the valve 63. The five inner channels 69 are sequentially coupled with the upstream channel 62a by moving the valve 63. When each of the inner channels 69 is coupled, the analyte is pumped to the inner channel 69. Finally, the analyte is pumped to all the inner channels 69 (see FIG. 8C). Herein, air present in the channel 62a in the initial state is mixed to the inner channel 69, to which the analyte is pumped first (the inner channel located at the most left side in the drawing). Owing to this, the analyte pumped to this inner channel 69 should not be used for the polymerase chain reaction (PCR). In this embodiment, therefore, the number of reagent chambers 93 is one fewer than the number of inner channels 69.

Then, the direction of the traveling wave generated by the ultrasonic stator becomes the opposite direction again, so that the valve 63 is moved toward the reagent chambers 93. The four inner channels 69 used for the polymerase chain reaction (PCR) are respectively coupled with the four downstream channels 62b formed in the substrate 68 (see FIG. 8D). Accordingly, the analyte in the inner channels 69 is mixed with the reagents in the reagent chambers 93. When the analyte is mixed with the reagents, it is desirable that the mixing is promoted with the use of the traveling wave generated by the ultrasonic stator. That is, by moving the inner channels 69 and the downstream channels 62b in a peristaltic manner, the analyte can be efficiently mixed with the reagents.

Figure 8D:
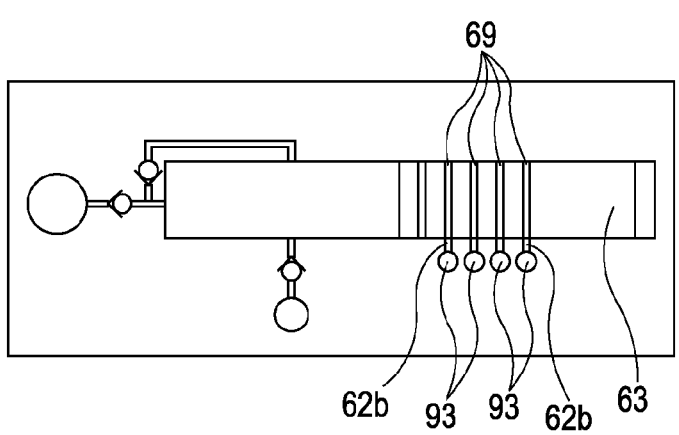

Then, in the state shown in FIG. 8D, the polymerase chain reaction (PCR) is performed. In the polymerase chain reaction (PCR), heating and cooling are repeated for the microfluidic chip 61 by a temperature control unit (not shown), thereby amplifying the nucleic acids in the analyte. At this time, when the reagent in the reagent chamber 93 is a probe which reacts specifically with a nucleic acid in the analyte, the probe emits fluorescent light through irradiation with the exciting light after the polymerase chain reaction is performed. Then, the intensity of the fluorescent light is detected by the sensor 72, so that the presence and the amount of a specific nucleic acid can be detected.

In this embodiment, the number of inner channels 69 is five and the number of reagent chambers 93 is four, however, the numbers are not limited thereto. The number of reagent chambers 93 may be changed depending on the number of reagents to react with the analyte. The number of inner channels 69 may be changed depending on the number of reagent chambers 93. Also, in this embodiment, while the example of the polymerase chain reaction (PCR) by the fluorescent probe method has been briefly described, the microfluidic device according to this embodiment may be used for various analyses.

While the microfluidic chip and the microfluidic device using the microfluidic chip of the present invention have been specifically described above, the present invention is not limited to the above-described embodiments. For example, the cross-sectional shape of the channel is not particularly limited.

Also, the shape and the moving direction of the valve are not particularly limited as long as passing of the fluid from the upstream portion to the downstream portion of the channel with respect to the valve is permitted or inhibited by the movement of the valve. For example, the shape of the valve may be a wedge or a column. Further, the shape of the valve may be a column, and the valve may be provided rotatably around the center axis of the column. In this case, an inner channel may be formed in a side surface of the column. Accordingly, passing of fluid from an upstream portion to a downstream portion of the channel with respect to the valve is permitted or inhibited via the inner channel by the rotation of the valve. In this case, the valve may be rotated by the traveling wave generated by the ultrasonic stator.

Also, depending on the purpose of use, it is sometimes desirable that a reference position is set for the valve of the microfluidic device using the microfluidic chip. Thus, the position of the valve when the ultrasonic stator is not operated is set. In this case, the valve and the substrate are connected with each other by an elastic body such as a spring. In this way, by applying a load to the valve, the valve can be provided at the specific reference position while the ultrasonic stator is not operated. The setting of the reference position does not have to be provided by using an elastic force of the elastic body. For example, a magnetic force may be used.

The microfluidic chip which does not have the reference position may be used as a microfluidic chip having a latch function. The valve is pressed to the substrate by the pressing unit. Hence, when the ultrasonic stator is not operated, the position of the valve is fixed by a frictional force. In this way, the pressing unit causes the latch function to be generated at the valve.

Next, a unit configured to smoothly move the valve of the microfluidic chip according to an embodiment of the present invention is described. To smoothly move the valve of the microfluidic chip, it is desirable that the frequency of the traveling wave to be generated by the ultrasonic stator is a resonant frequency which causes the microfluidic device with the microfluidic chip held therein to be resonated (hereinafter, merely referred to as resonant frequency). The resonant frequency varies depending on an individual microfluidic chip, and a holding condition of the microfluidic chip. Thus, it is desirable that the frequency of the traveling wave to be generated by the ultrasonic stator is set for every microfluidic chip.

Figure 9:
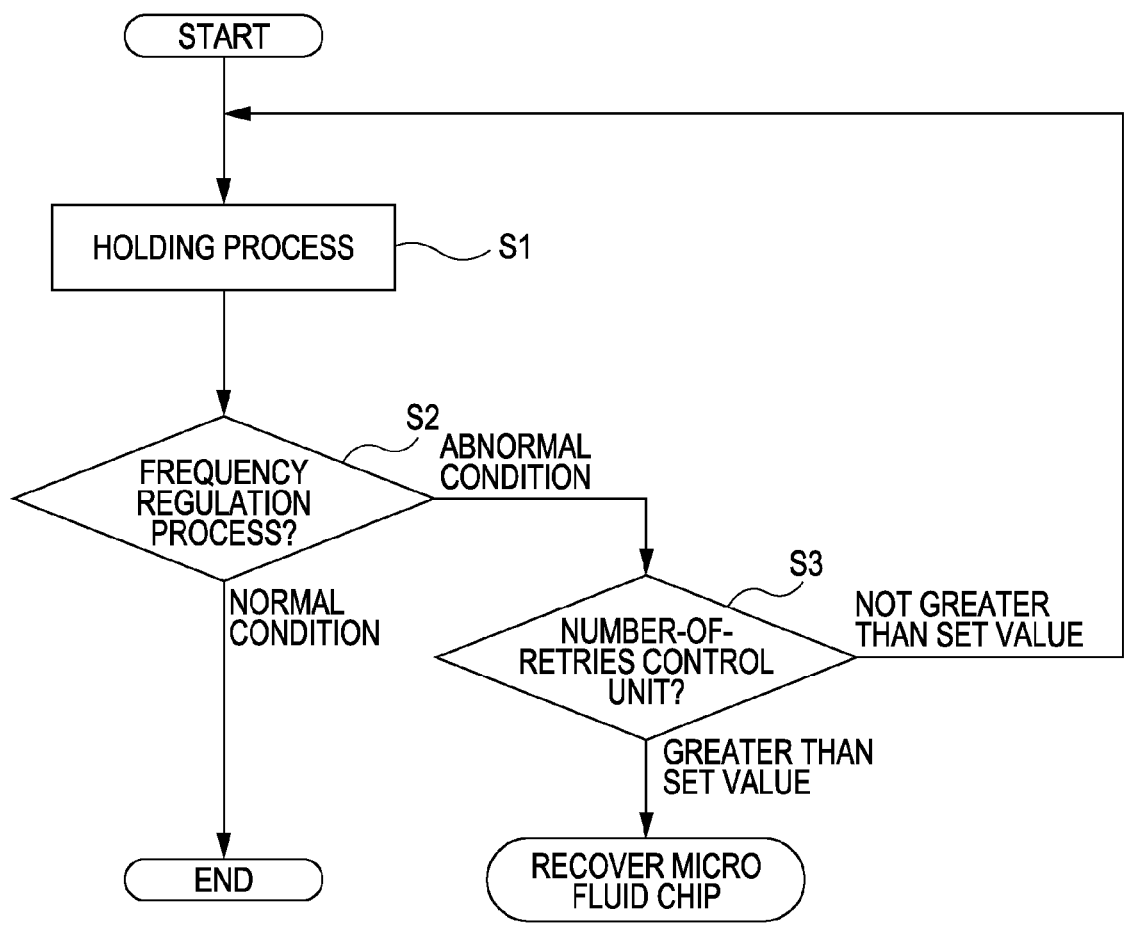
FIG. 9 is a flowchart showing a setting process of setting a frequency of a traveling wave generated by an ultrasonic stator to a resonant frequency which causes the microfluidic device to be resonated.
Figure 10A:
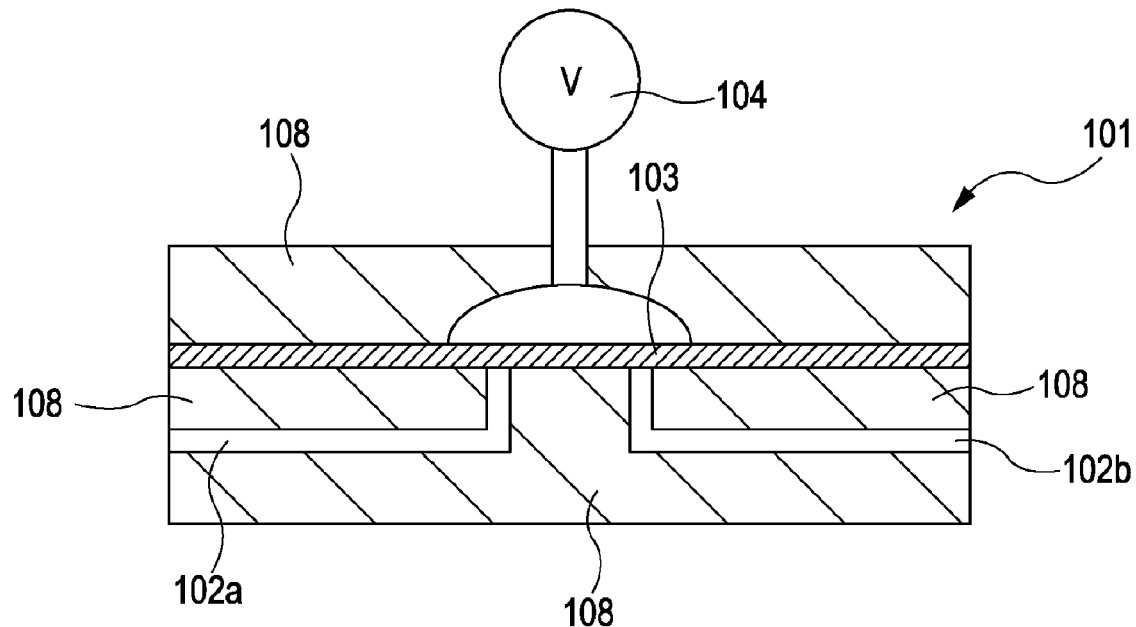
FIG. 10A illustrates a microfluidic chip in a valve-closing state.
Figure 10B:
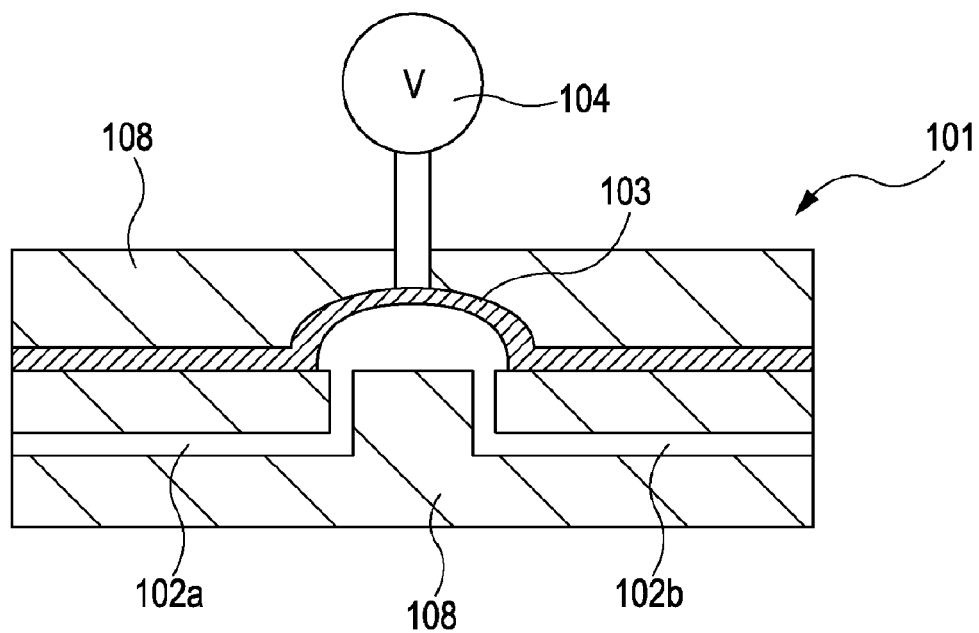
FIG. 10B illustrates the microfluidic chip in a valve-opening state, according to a conventional example.
Figure 11A:
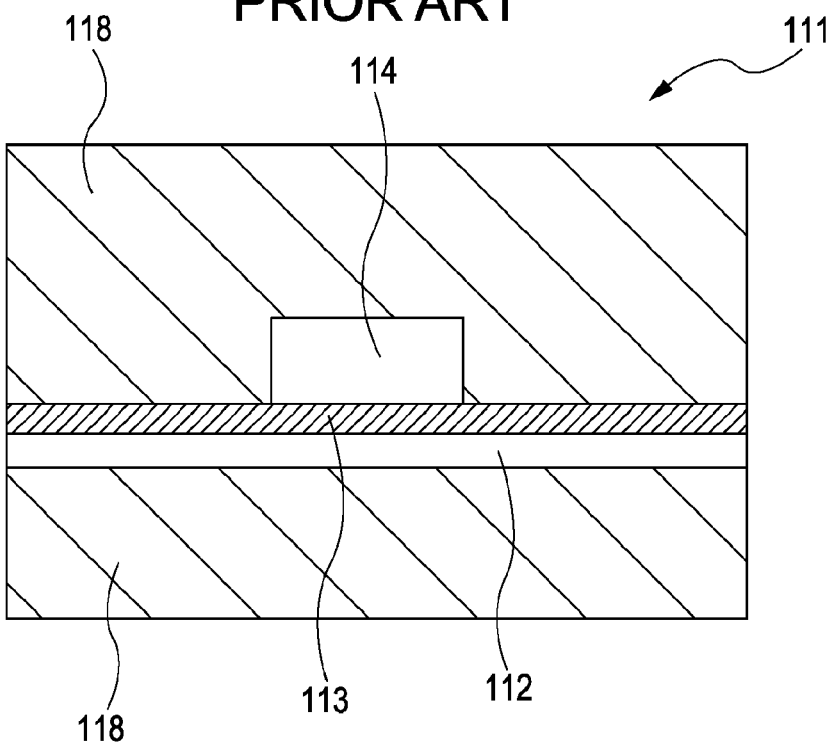
FIG. 11A illustrates a microfluidic chip in a valve-opening state.
Figure 11B:
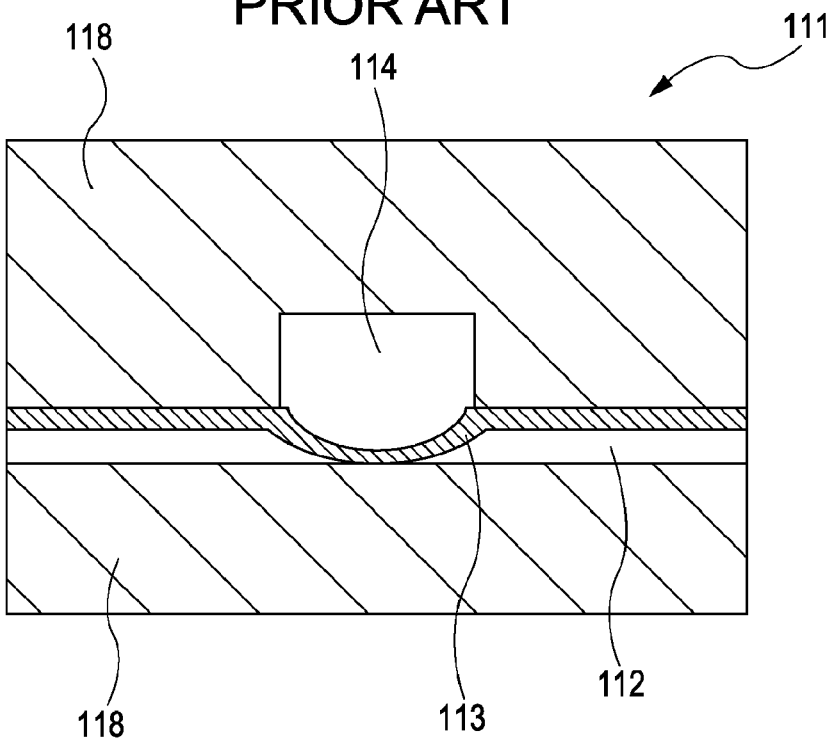
FIG. 11B illustrates the microfluidic chip in a valve-closing state, according to a conventional example.

FIG. 9 is a flowchart showing a control process for setting the frequency in a frequency regulation unit to set the frequency of the traveling wave to be generated by the ultrasonic stator to the resonant frequency. The control process includes at least a holding process S1 and a frequency regulation process S2.

The holding process S1 is a process of holding the microfluidic chip at the holding portion of the ultrasonic stator. In the holding process S1, the microfluidic chip is conveyed, and is held at the holding portion on the ultrasonic stator.

In the frequency regulation process S2, while the microfluidic chip is held at the holding portion, the frequency of the traveling wave generated by the ultrasonic stator is regulated such that the microfluidic device is resonated. A specific example of the control method is described below. First, the ultrasonic stator generates a sine wave with a constant amplitude. Then, the amplitude of a vibration of the microfluidic device is monitored while the frequency of the sine wave is changed. The amplitude may be measured by a piezoelectric element for displacement measurement, and using an output from the piezoelectric element. Alternatively, a noncontact displacement meter, such as a laser Doppler displacement meter, may be provided to measure the amplitude. The position for the measurement of the amplitude is not particularly limited as long as the position is at a portion of the microfluidic device, such as at the microfluidic chip, the ultrasonic stator, or the holding portion of the ultrasonic stator. The frequency of the sine wave generated by the ultrasonic stator with the maximum measured amplitude is set as the resonant frequency.

Herein, it is desirable that the above-described frequency regulation process S2 is performed a plurality of times and reproducibility of the resonant frequency or reproducibility of the amplitude of the vibration is checked. When a microfluidic device having an equivalent structure is used, its resonant frequency is assumed to fall within a certain range. Thus, a distribution of resonant frequencies may be previously measured for a microfluidic device with a plurality of microfluidic chips held therein. Accordingly, the distribution can be used as a reference for determining the quality of a microfluidic chip to be newly used, and the quality of a holding state of the microfluidic chip. That is, the distribution of the previously measured resonant frequencies is set as a frequency band of a normal range. Then, if the resonant frequency set in the frequency regulation process S2 falls within the previously set frequency band, the resonant frequency is set as the frequency of the traveling wave to be generated by the ultrasonic stator. In contrast, if the resonant frequency set in the frequency regulation process S2 exceeds the previously set frequency band, or if the reproducibility of the resonant frequency or the reproducibility of the amplitude is low, it is determined that the microfluidic chip is in an abnormal condition. The microfluidic chip determined as in the abnormal condition is considered as a microfluidic chip of the abnormal holding state, or a defective microfluidic chip. Thus, if the microfluidic chip is determined as in the abnormal condition, it is considered that the microfluidic chip is possibly a microfluidic chip of an abnormal holding condition, and hence, it is desirable that the control process with a number-of-retries control unit S3, which will be described later, is performed.

The number-of-retries control unit S3 counts the number of determinations as the abnormal condition in the frequency regulation process S2 (hereinafter, referred to as the number of retries). If the number of retries is not greater than a previously set value, the holding condition of the microfluidic chip is released. The holding process S1 is performed again, and then, the frequency regulation process S2 is performed again. If the number of retries is greater than the set value, the microfluidic chip may be defective. Thus, the frequency setting process is interrupted, and the microfluidic chip is recovered. In this way, the defective microfluidic chip can be recovered in the frequency setting process.

By performing the frequency setting process, the frequency of the traveling wave to be generated by the ultrasonic stator can be set to the resonant frequency which causes the microfluidic device with the microfluidic chip held therein to be resonated. Accordingly, the valve can be smoothly moved by using the traveling wave with the resonant frequency set as described above.

The above-described resonant frequency setting process is merely an embodiment, and the method is not limited thereto. For example, the frequency may be set by a single holding process S1 and a single frequency regulation process S2, as long as the valve can be smoothly moved.

While the moving method of the valve using the ultrasonic stator has been specifically described above, the moving unit is not limited to the ultrasonic stator. For example, an oscillator with a frequency domain which is not corresponding to ultrasound may be used. Such an oscillator may be used particularly when a resonant frequency has a frequency domain which is not corresponding to the ultrasound. Also, the valve does not have to be moved by the vibration caused by the traveling wave. For example, a magnetic force may be used. A portion of a valve may be formed of a magnetic body, and an electromagnet may be provided outside a microfluidic chip. Accordingly, the valve can be moved by the magnetic force applied from the electromagnet.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-300343 filed Nov. 20, 2007, which is hereby incorporated by reference herein in its entirety.

What is claimed is:

1. A microfluidic valve device comprising:
    a microfluidic chip including a substrate having a channel and an inner chamber;
    a valve disposed within the inner chamber and configured to change a conductance of the channel, with the valve having an inner channel formed therein; and
    an oscillator configured to generate a traveling wave,
    wherein the valve is moved by generating the traveling wave to open and close the channel.

2. The microfluidic valve device according to claim 1, wherein passing of fluid from a first portion to a second portion of the channel with respect to the valve is permitted or inhibited via the inner channel by the movement of the valve.

3. The microfluidic valve device according to claim 2, wherein the valve is provided to decouple the first portion from the second portion of the channel, and
    wherein the inner channel is capable of being coupled with the channel by the movement of the valve.

4. The microfluidic valve device according to claim 1, further comprising a pressing unit configured to press the valve to the substrate.

5. The microfluidic valve device according to claim 1, further comprising a detecting unit configured to detect a travel distance of the valve.

6. The microfluidic valve device according to claim 5, wherein the valve has a scale,
    wherein the substrate has a reference scale at a position opposite to a position of the scale, and
    wherein the detecting unit is a detection system configured to detect the scale and the reference scale in a noncontact manner.

7. The microfluidic valve device according to claim 6, wherein the valve has a scale,
    wherein the substrate has a reference scale at a position opposite to a position of the scale, and
    wherein the detecting unit is a detection system configured to detect the scale and the reference scale in a noncontact manner.

8. The microfluidic valve device according to claim 1, further comprising:
    a pumping unit configured to pump the fluid to the channel,
    wherein the pumping unit uses a change of pressure in the channel caused by the movement of the valve.

9. The microfluidic valve device according to claim 1, wherein a frequency of the traveling wave is a resonant frequency which causes the microfluidic valve device to be resonated.

10. The microfluidic valve device according to claim 1, wherein the valve is moved in a longitudinal direction of the inner chamber.

11. The microfluidic valve device according to claim 1, wherein the valve is moved in a direction perpendicular to a longitudinal direction of the channel.

12. The microfluidic valve device according to claim 1, wherein the valve is moved in a linear direction.

13. The microfluidic valve device according to claim 1, wherein the valve is moved in a rotational direction.

14. A microfluidic valve device comprising:
    a microfluidic chip including a substrate having a channel and a pressure-generating portion within the channel;
    a valve provided movably in the pressure-generating portion, with the valve having an inner channel therein; and
    an oscillator configured to generate a traveling wave to move the valve,
    wherein a pressure of the pressure-generating portion increases or decreases in accordance with movement of the valve, so that fluid in the channel is pumped.

15. The microfluidic valve device according to claim 14, further comprising a pressing unit configured to press the valve to the substrate.

16. The microfluidic valve device according to claim 14, further comprising a detecting unit configured to detect a travel distance of the valve.

17. A microfluidic device comprising:
    a microfluidic chip including a substrate having a channel and a pressure-generating portion within the channel;
    a valve provided movably in the pressure-generating portion, with the valve having an inner channel formed therein;
    an oscillator configured to generate a traveling wave to move the valve;
    an analyte chamber in fluid communication with the channel; and
    a reagent chamber in fluid communication with the channel,
    wherein movement of the valve generates pressure within the pressure-generating portion to pump fluid from the analyte chamber to the reagent chamber.

18. The microfluidic device according to claim 17, further comprising a frequency setting unit configured to set the frequency of the traveling wave to a resonant frequency.

19. The microfluidic device according to claim 18, further comprising:

a unit configured to control the traveling wave to be set to the resonant frequency, wherein the frequency setting unit performs the setting of the resonant frequency a plurality of times, and checks reproducibility of the resonant frequency or reproducibility of an amplitude of a vibration with the resonant frequency, and wherein, if the reproducibility is low, the unit performs the control.

20. The microfluidic device according to claim 18, further comprising a unit configured to set the frequency of the traveling wave to the resonant frequency if the resonant frequency falls within a previously set frequency band, and control the frequency of the traveling wave to be set to the resonant frequency if the resonant frequency exceeds the frequency band.

21. The microfluidic device according to claim 19, further comprising a number-of-retries control unit configured to count the number of times the setting of the frequency of the traveling wave to the resonant frequency is performed, and if the number of times is greater than a previously set value, perform control for interrupting the setting of the resonant frequency.

* * * * *